No. 805,836. PATENTED NOV. 28, 1905.
R. BAGGALEY.
METHOD OF PRODUCING IRON.
APPLICATION FILED OCT. 11, 1904.
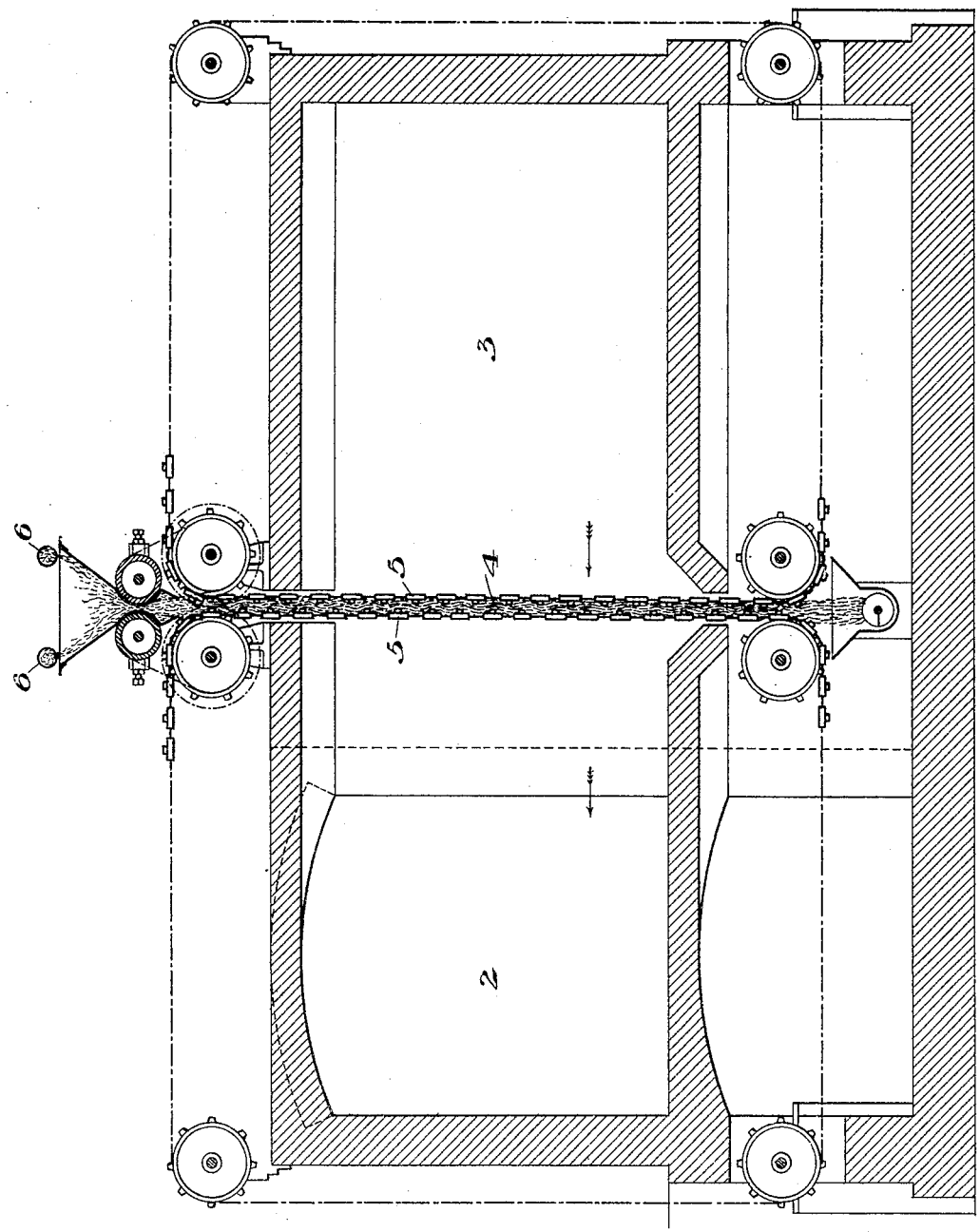
WITNESSES
Warren W. Swartz
H. W. Corwin
INVENTOR
Ralph Baggaley
by Bakewell & Byrnes
his attorneys

UNITED STATES PATENT OFFICE.

RALPH BAGGALEY, OF PITTSBURG, PENNSYLVANIA.

METHOD OF PRODUCING IRON.

No. 805,836.  Specification of Letters Patent.  Patented Nov. 28, 1905.

Application filed October 11, 1904. Serial No. 228,044.

*To all whom it may concern:*

Be it known that I, RALPH BAGGALEY, of Pittsburg, Allegheny county, Pennsylvania, have invented a new and useful Method of Producing Iron, of which the following is a full, clear, and exact description, reference being had to the accompanying drawing, forming part of this specification, which shows in vertical section apparatus suitable for the practice of the first step of my process.

The object of my invention is to produce iron of commercial value from a material which has hitherto been regarded as a waste product; and to that end my invention consists in passing the gases from a metallurgical furnace treating ores or mattes containing iron and sulfur through a screen of suitable material on which a compound containing iron, sulfur, and other impurities is deposited by the gases in the form of a hard crust, subsequently subliming the sulfur and preferably collecting it in form suitable for commercial use, and then taking the residue, which consists largely of iron and is in a cinder-like coherent form, and smelting it in a suitable furnace for the elimination of the contained impurities and for the production of metallic iron or steel.

The accompanying drawing shows apparatus suitable for the deposit of the sulfur-and-iron-bearing impurities from the furnace gases.

2 represents a flue leading from a smelting-furnace for smelting sulfid ores of copper or other metal and communicating with a stack or other means for inducing a draft. In said flue is a chamber 3, through which passes a screen 4, composed of vegetable substance, such as kelp, straw, cactus, branches, or the like.

5 represents mechanism by which the screen is moved, and 6 6 are pipes by which the screen material is wetted with streams of water.

The fumes from the smelter, passing through the screen, deposit thereon a hard crust containing metals and metalloids and consisting principally of iron and sulfur in approximately equal proportions. A copper-smelting furnace that smelts three hundred and sixty tons of ordinary sulfid ores will yield gases from which can be precipitated from sixty to eighty or even one hundred tons of such metals and metalloids in each period of twenty-four hours, so that the material accumulated on the precipitating-screen will contain approximately thirty to fifty tons of iron. When the screen has been charged with the precipitated materials to the full extent desired or to the full extent of which the screen is capable, the material of the screen is removed and preferably dried and is then subjected to heat, by which the sulfur which it contains is sublimed, leaving in a coherent cinder-like form the residual iron in combination with some sulfur and other impurities. The vegetable-screen material above described is well adapted for this purpose. Being combustible, it can be ignited and will itself furnish the required heat for the subliming of the sulfur.

Within the scope of my invention, broadly considered, other forms of screen and other screen materials may be used, and, if desired, the screen material may consist of charcoal; but owing to its increased cost over comparatively worthless vegetable fiber the use of the latter will be found more economical.

I take the residual material after the subliming and removal of the sulfur and introduce it into a smelting-furnace, in which the iron is reduced to metallic form and may be tapped from the furnace as pig-iron or may be bessemerized in the same or a separate furnace for the production of Bessemer steel. The iron produced from this material is practically free from phosphorus, since this element is seldom present in copper-sulfid ores. Being in coherent form, the material is well adapted to be smelted and is not subject to the difficulties incident to the smelting of fine flue-dust, which on being charged into a blast-furnace will be blown from it by the blast.

By the use of my invention I am enabled not only to remove the impurities from the gases, and thus to prevent the injurious effects to vegetation which are commonly produced in the vicinity of smelter plants by such gases, but also to utilize profitably the waste product of the purifying operation and to produce therefrom iron of good quality.

Those skilled in the art may vary my invention in many ways, since

What I claim is—

1. The process herein described of producing iron which consists in precipitating on screen material a crust of iron-and-sulfur-bearing impurities from furnace-fumes, removing sulfur therefrom and then smelting the residue and recovering the iron; substantially as described.

2. The process herein described of producing iron which consists in precipitating on screen material a crust of iron-and-sulfur-bearing impurities from furnace-fumes, and then smelting the precipitated material and recovering the iron; substantially as described.

3. The process herein described of producing iron from the fumes of metallurgical furnaces treating ores or mattes containing iron and sulfur, which consists in passing such fumes through a screen, and thereby precipitating thereon a crust of iron-and-sulfur-bearing impurities, then removing the sulfur by sublimation, and finally recovering the iron from the residue; substantially as described.

4. The herein-described process of recovering iron from the iron-and-sulfur-bearing fumes of metallurgical furnaces, which consists in passing such fumes through a combustible screen, and thereby depositing thereon a crust of iron-and-sulfur-bearing material, then burning the screen to sublime the sulfur thereon, and finally recovering the iron from the residue; substantially as described.

In testimony whereof I have hereunto set my hand October 7, 1904.

RALPH BAGGALEY.

Witnesses:
 THOMAS W. BAKEWELL,
 GEO. B. BLEMING.